Jan. 27, 1959  G. BAECKLUND  2,870,866
METHOD OF OBTAINING ACETALDEHYDE
Filed June 14, 1952
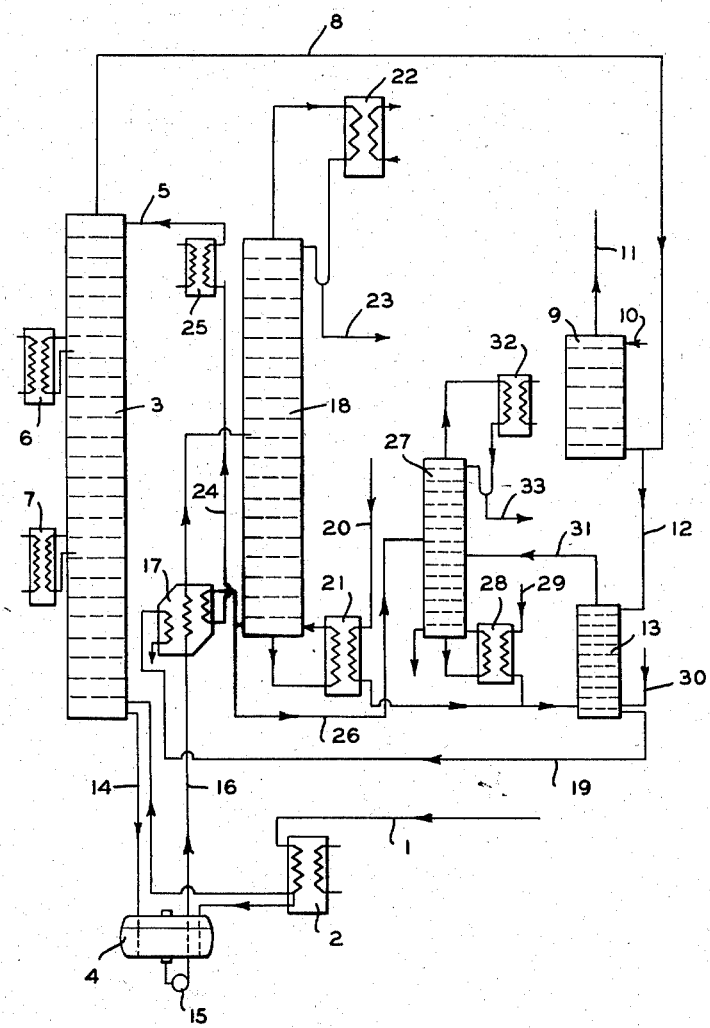
INVENTOR
GUNNAR BAECKLUND
BY Jarvis C. Marble
ATTORNEY

2,870,866

Patented Jan. 27, 1959

2,870,866
METHOD OF OBTAINING ACETALDEHYDE

Gunnar Baecklund, Stockholm, Sweden, assignor to Aktiebolaget Chematur, Stockholm, Sweden, a corporation of Sweden Application June 14, 1952, Serial No. 293,532

10 Claims. (Cl. 183—115)

This invention relates to an improvement in recovering acetaldehyde out of gases, obtained from ethyl alcohol by catalysis i. e. gases from catalytic oxidation, catalytic dehydrogenation or from a combined catalytic oxidation-dehydrogenation of ethyl alcohol.

An object of my invention is to recover acetaldehyde out of gases from catalysis of ethyl alcohol in an economical manner, whereby considerable amounts of heat may be saved and equipment costs may be reduced.

Heretofore it has been proposed to extract acetaldehyde as well as unreacted ethyl alcohol with water out of gases from catalytic oxidation of ethyl alcohol. From the solution thus obtained, acetaldehyde is obtained by stripping, and the alcohol from the weak stripped acetaldehyde free alcohol-water mixture recovered by distillation. The composition of such a solution in equilibrium at room temperature with gas from a catalytic reaction, is for instance 86% water, 6% acetaldehyde and 8% ethyl alcohol. It is evident that large quantities of water must be used as acetaldehyde, though it can be mixed with water in all proportions, has a relatively high vapor pressure, and can easily be separated from such a solution (the vapor liquid equilibrium relationship is for instance in a 1 mol percent solution about 50).

The essence of my invention consists in using diluted ethyl alcohol of comparatively high strength instead of water to extract acetaldehyde out of gases from catalysis of ethyl alcohol. Other objects and advantages of the invention will appear hereinafter.

The process is illustrated with reference to the drawing, which is a diagrammatic showing of apparatus, which may be used in the said extraction.

Ethyl alcohol is catalytically oxidized with air. The resulting reaction gases are led by pipe 1 to a cooler 2, where the gases are cooled to room temperature. Condensate, flows down in a tank 4.

Aldehyde vapors and uncondensed gases are led to an absorber or scrubber 3, built for instance as a sieve plate tower, in counter-current to $C_2H_5OH + H_2O$ introduced by pipe 5 in the top of the absorber 3. During scrubbing, the absorbant is cooled either by built in colling surfaces or in coolers (6 and 7) arranged outside the absorber.

After scrubbing the unabsorbed gas, the composition containing about 5% alcohol is led by pipe 8 to a washing tower 9, where the gas is scrubbed by $H_2O$ introduced by pipe 10 to recover the ethyl alcohol. The remaining gas, free from ethyl alcohol, leaves the top of the tower 9 by pipe 11 and the water-ethyl alcohol is removed from the bottom of the tower and led by pipe 12 to the stripper 13.

The ethyl alcoholic absorbate containing acetaldehyde coming from the absorber 3, is led by pipe 14 to the tank 4, from which the absorbate, together with condensate from the cooler 2, is fed by pump 15 and pipe 16 through a heat exchanger 17 to a fractionating tower 18, working under pressure. In the heat exchanger 17 the liquid is preheated on one hand with water of 105° C. coming from the stripper 13 and on the other hand with about 55% ethyl alcohol-water mixture of 125° C. coming from the fractioning tower 18. Live steam is conducted into the reboiler 21 by pipe 20. Hot condensate (140° C.) from the reboiler is led to the stripper 13 to make use of its heat content.

Acetaldehyde is obtained as top fraction from the tower 18, and is condensed in the condenser 22. Part of the condensate is returned to the tower 18 as reflux and the rest leaves the process by pipe 23. Part of the acetaldehyde-free ethyl alcohol-water mixture in the bottom of the tower 18 is as previously mentioned led through the heat exchanger and from there by pipe 24 to a cooler 25 and then by pipe 5 to the absorber 3. The other part is introduced by means of pipe 26 into a fractionating column 27 to rectify the ethyl alcohol. Condensate from the reboiler 28 to the column 27 is withdrawn and led together with condensate from the reboiler 21 to the column 13. Live steam can also be introduced by means of pipe 30 as a complement to the said condensates. Ethyl alcohol vapors from the column or stripper 13 are conducted by pipe 31 to the column 27. Alcoholic vapors leaving the top of the column 27 are condensed in condenser 32. Part of the condensate is refluxed and the rest taken out by pipe 33 to be fed back to the catalytic oxidation process.

It is to be understood that the foregoing detailed description is given merely by way of illustration and that many variations may be made therein without departing from the spirit of the invention. For example, instead of using gases from catalytic oxidation of ethyl alcohol as in the above mentioned example, gases from catalytic dehydrogenation or from a combined oxidation-dehydrogenation process may be used. A dehydrogenation process for instance may be schematically illustrated by the formula:

$$C_2H_5OH + H_2O = CH_3CHO + C_2H_5OH + H_2 + H_2O +$$ 

smaller amounts of ethyl acetate methyl ethyl ketone and acetic acid.

The conversion of alcohol is in this example about 50% against a conversion of about 65% in the exemplified oxidation process. After condensing, the gas consists of principally $CH_3CHO + C_2H_5OH + H_2O + H_2$. This gas is scrubbed with $C_2H_5OH + H_2O$. The ethyl alcohol content in the washing or scrubbing liquid is in this example about 90% against 50% in the oxidation example.

An important characteristic of the invention is that the ethyl alcoholic absorbate has not more than 60% water in it. In most practical cases the washing liquid should not contain more than 50% water when scrubbing gases from catalytic oxidation of ethyl alcohol and not more than 25% water in the case of gases from dehydrogenation of ethyl alcohol. When using gases from a mixed oxidation-dehydrogenation catalysis of ethyl alcohol, the gases may be scrubbed with ethyl alcohol-water mixture with a composition somewhere between the said limits.

The use of ethyl alcohol-water instead of water as scrubbing liquid to extract acetaldehyde out of gases from catalysis of ethyl alcohol has many advantages. The necessary apparatus can be made smaller as much smaller quantities of scrubbing liquid are used. As acetaldehyde is more strongly held in solution by ethyl alcohol than by water, it is possible to work with higher temperatures in the scrubbing or absorption tower, i. e. the cooling surfaces can work with larger differences in temperature and be made smaller. In the stripping of the dissolved acetaldehyde smaller quantities of heat are used to heat the liquid.

As a whole the invention makes it possible to save considerable amounts of heat as well as to reduce equipment costs.

Having described my invention, what I desire to secure by Letters Patent is:

1. Method of obtaining acetaldehyde from acetaldehyde containing gases obtained from ethyl alcohol by catalysis by washing with an ethyl alcohol-water mixture of such a strength that the absorbate does not contain more water than from 60 to 10 percent by weight.

2. Method of obtaining acetaldehyde from acetaldehyde containing gases by washing with an ethyl alcohol-water mixture of such a strength that the absorbate of acetaldehyde, ethyl alcohol and water does not contain more water than from 60 to 10 percent by weight and that the acetaldehyde containing mixture is stripped of acetaldehyde.

3. Method of obtaining acetaldehyde from acetaldehyde containing gases by washing with an ethyl alcohol-water mixture of such a strength that the resulting mixture of acetaldehyde, ethyl alcohol and water does not contain more water than from 60 to 10 percent by weight and that the unabsorbed vapor and gases are washed with water to extract ethyl alcohol.

4. Method of obtaining acetaldehyde from gases from catalytic oxidation of ethyl alcohol by washing with an ethyl alcohol-water mixture with maximum 60% water and not less than 10%.

5. Method of obtaining acetaldehyde from gases from catalytic oxidation of ethyl alcohol by washing with an ethyl alcohol water mixture with an ethyl alcohol content from 40% to 90% by weight.

6. The method of claim 5 in which the alcohol content is from 50% to 90% by weight.

7. Method of obtaining acetaldehyde from gases from dehydrogenating of ethyl alcohol by washing with an ethyl alcohol water mixture with an ethyl alcohol content from 75% to 90% by weight.

8. The method of claim 7 in which the alcohol content is from 80–90% by weight.

9. Method of obtaining acetaldehyde from acetaldehyde containing gases by washing with an ethyl alcohol-water mixture of such a strength that the mixture of acetaldehyde, ethyl alcohol and water in contact with incoming gases does not contain more water than 60 percent and not less than 10% by weight and that the acetaldehyde containing mixture is stripped of acetaldehyde and thereafter distilled to recover ethyl alcohol.

10. Method of obtaining acetaldehyde from acetaldehyde containing gases by washing with an ethyl alcohol-water mixture of such a strength that the mixture of acetaldehyde, ethyl alcohol and water in contact with incoming gases does not contain more water than 60% and not less than 10% by weight and that the acetaldehyde containing mixture is stripped of acetaldehyde and recycled as washing liquid for the acetaldehyde containing gases.

References Cited in the file of this patent
UNITED STATES PATENTS

| | | |
|---|---|---|
| 1,426,449 | Backhaus et al. | Aug. 22, 1922 |
| 1,956,440 | Fuchs | Apr. 24, 1934 |
| 2,083,877 | Steck et al. | June 15, 1937 |
| 2,173,111 | Hasche | Sept. 19, 1939 |
| 2,204,652 | Bludworth | June 18, 1940 |
| 2,249,847 | Murray | July 22, 1941 |

OTHER REFERENCES

"Handbook of Chemistry and Physics," 31st edition, Chemical Rubber Publishing Co., page 611 thereof.